US010365431B2

(12) United States Patent
Héroux et al.

(10) Patent No.: US 10,365,431 B2
(45) Date of Patent: Jul. 30, 2019

(54) OPTICAL INTERCONNECT STRUCTURE

(71) Applicant: INTERNATIONAL BUSINESS MACHINES CORPORATION, Armonk, NY (US)

(72) Inventors: Jean Benoit Héroux, Kawasaki (JP); Masao Tokunari, Kawasaki (JP)

(73) Assignee: International Business Machines Corporation, Armonk, NY (US)

(*) Notice: Subject to any disclaimer, the term of this patent is extended or adjusted under 35 U.S.C. 154(b) by 6 days.

(21) Appl. No.: 15/296,102

(22) Filed: Oct. 18, 2016

(65) Prior Publication Data

US 2018/0106965 A1 Apr. 19, 2018

(51) Int. Cl.
*G02B 6/12* (2006.01)
*G02B 6/43* (2006.01)
*G02B 6/13* (2006.01)

(52) U.S. Cl.
CPC .......... *G02B 6/12004* (2013.01); *G02B 6/13* (2013.01); *G02B 6/43* (2013.01); *G02B 2006/12104* (2013.01); *G02B 2006/12109* (2013.01); *G02B 2006/12147* (2013.01)

(58) Field of Classification Search
CPC ........ G02B 6/12004; G02B 6/13; G02B 6/43; G02B 2006/12109; G02B 2006/12147; G02B 2006/12104; G02B 6/4214
See application file for complete search history.

(56) References Cited

U.S. PATENT DOCUMENTS

| 6,987,906 B2 * | 1/2006 | Nakama ............. G02B 6/12004 385/15 |
| 7,433,554 B2 * | 10/2008 | Warashina ............... G02B 6/43 385/132 |
| 9,086,551 B2 * | 7/2015 | Heroux ................ G02B 6/4215 |
| 2003/0081321 A1 | 5/2003 | Moon et al. |

FOREIGN PATENT DOCUMENTS

JP  2015087756 A  5/2015

OTHER PUBLICATIONS

Immonen, M. et al., "Fabrication of Polymer Optical Waveguides with Integrated Micromirrors for Out-of-Plane Surface Normal Optical Interconnects" Polytronic (Sep. 2004) pp. 206-210.
Wang, F. et al., "45 Degree Polymer Micromirror Integration for Board-Level Three-Dimensional Optical Interconnects" Optics Express (Jun. 2009) pp. 10514-10521, vol. 17, No. 13.
Wang, X. et al., "Fully Embedded Board-Level Optical Interconnects From Waveguide Fabrication to Device Integration" Journal of Lightwave Technology (Jan. 2008) pp. 243-250, vol. 26, No. 2.

* cited by examiner

*Primary Examiner* — John Bedtelyon
(74) *Attorney, Agent, or Firm* — Tutnjian & Bitetto, P.C.; Vazken Alexanian

(57) ABSTRACT

An optical interconnect structure and method are provided. The optical interconnect structure includes a plate on which a mirror is formed. The optical interconnect structure further includes a waveguide structure comprising a waveguide core and an opening. The plate is mounted on the waveguide structure such the mirror is inserted in the opening for light coupling (i) from the waveguide core and to an optical element positioned on the plate and (ii) to the waveguide core from the optical element positioned on the plate.

13 Claims, 15 Drawing Sheets

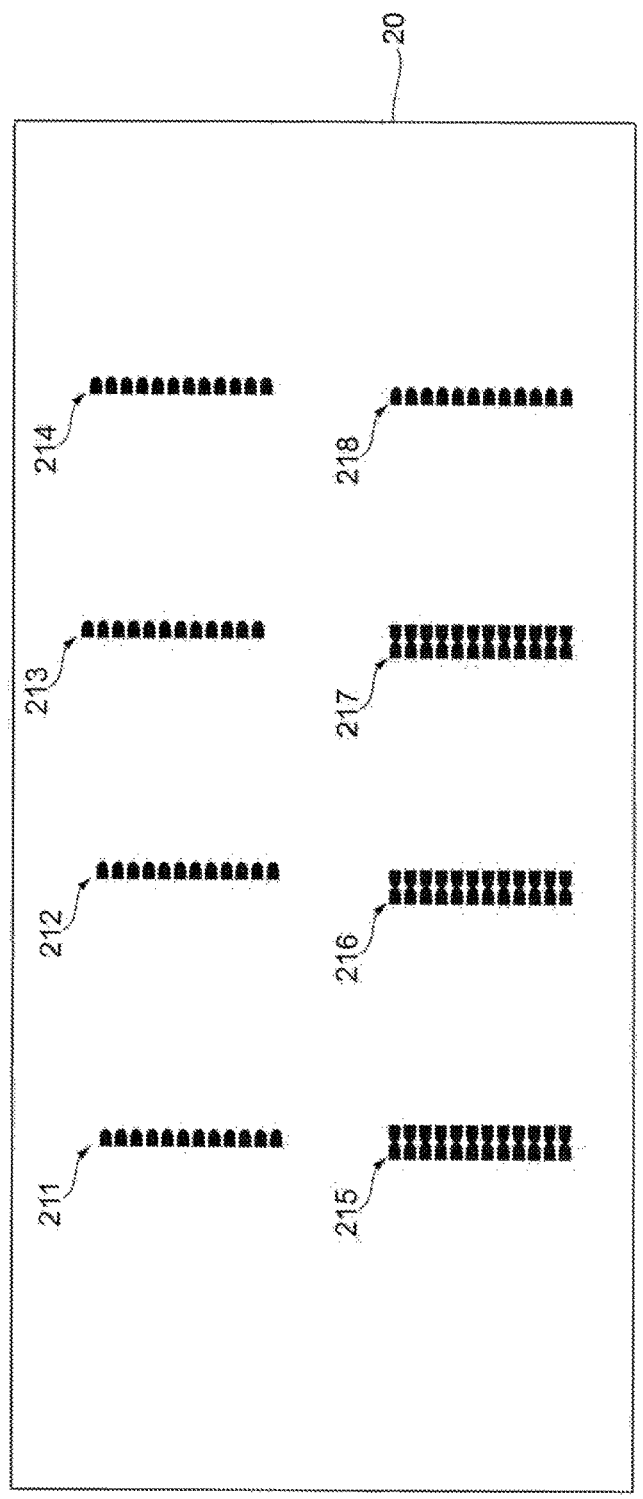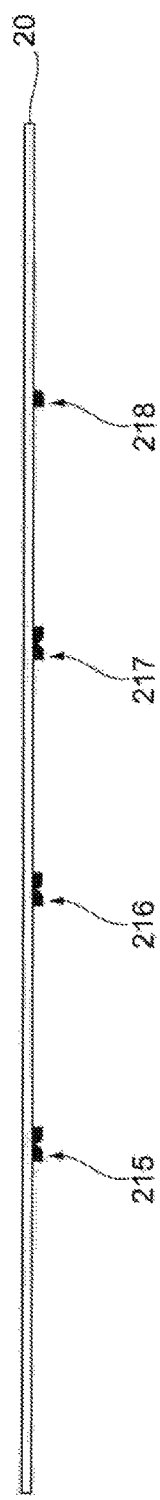

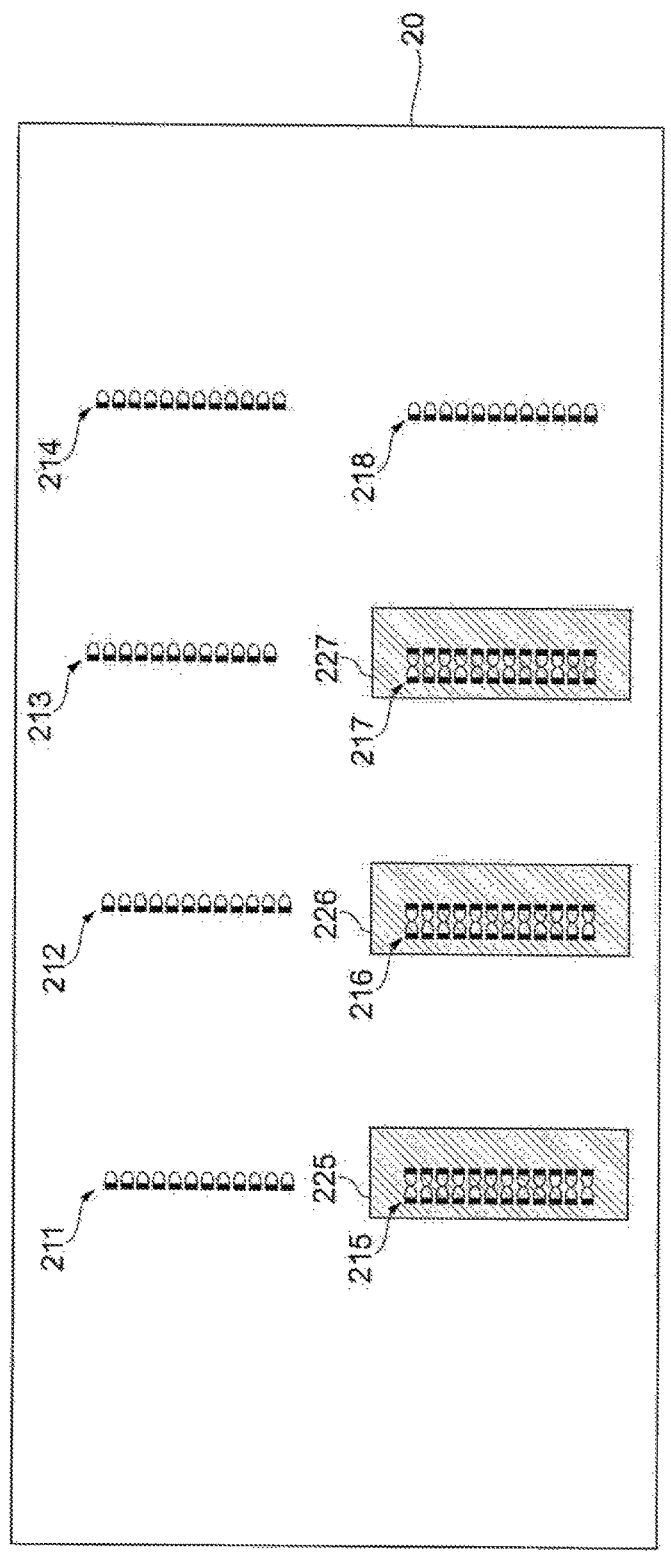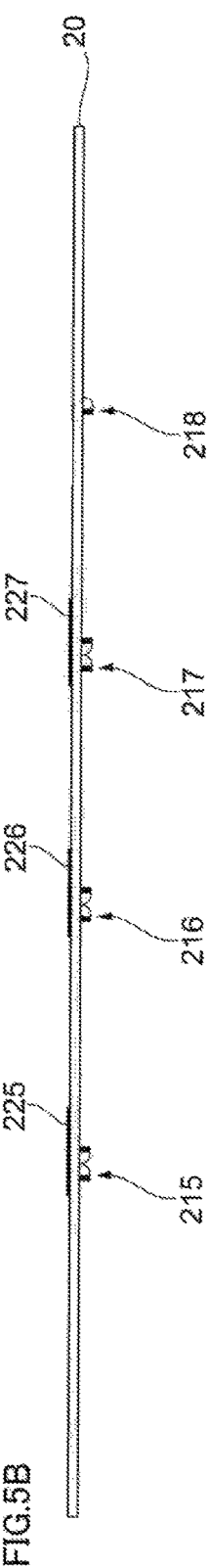

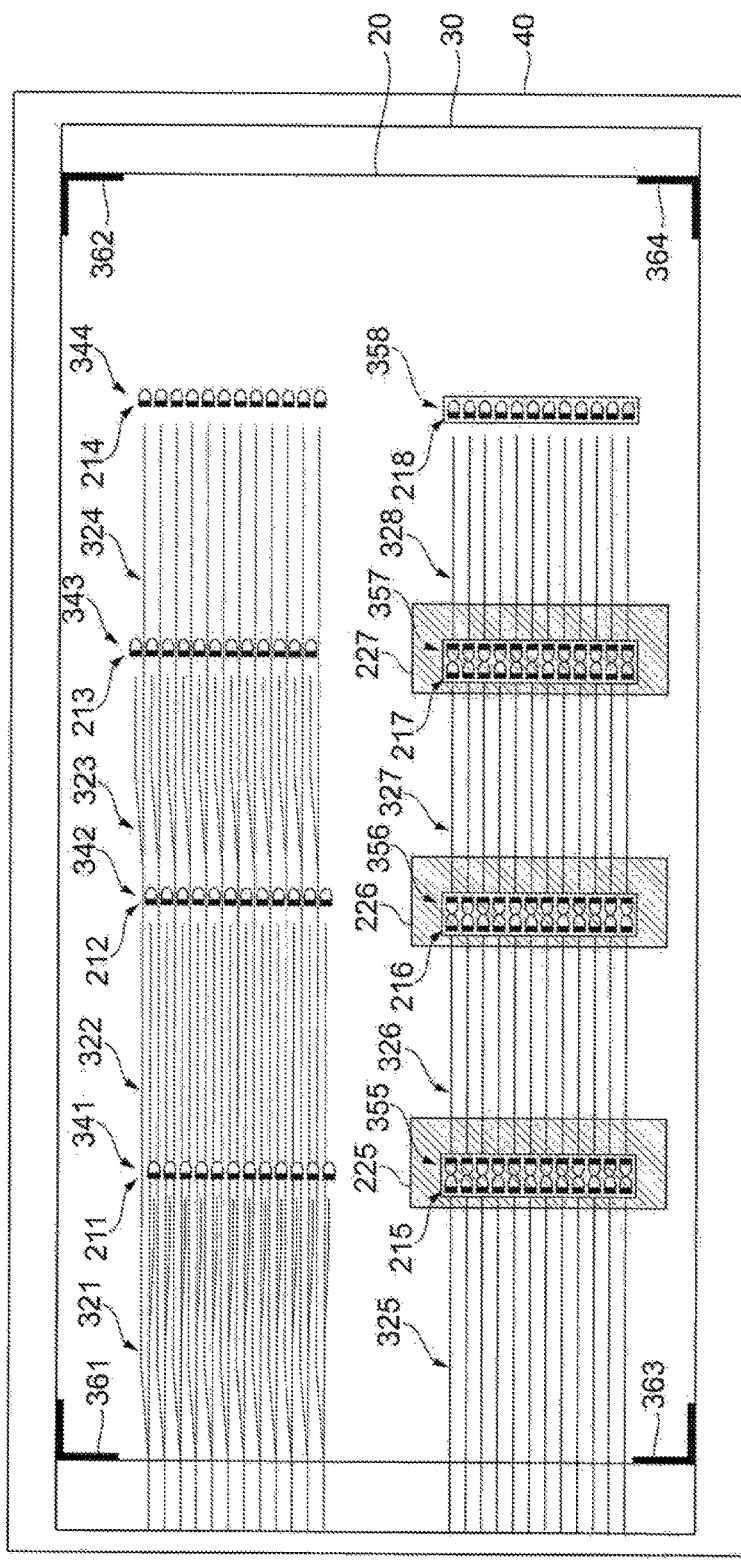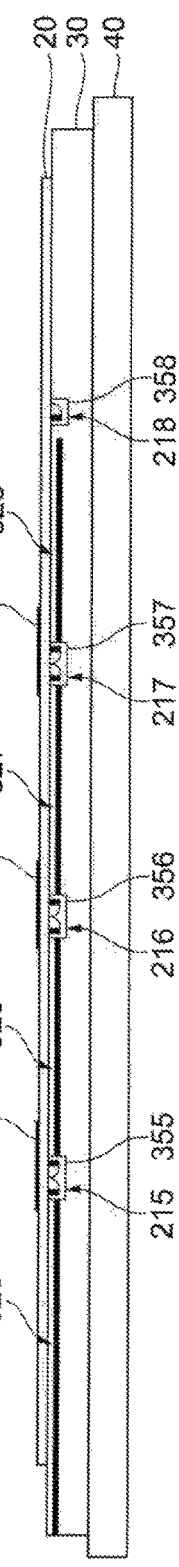
FIG.8A
FIG.8B

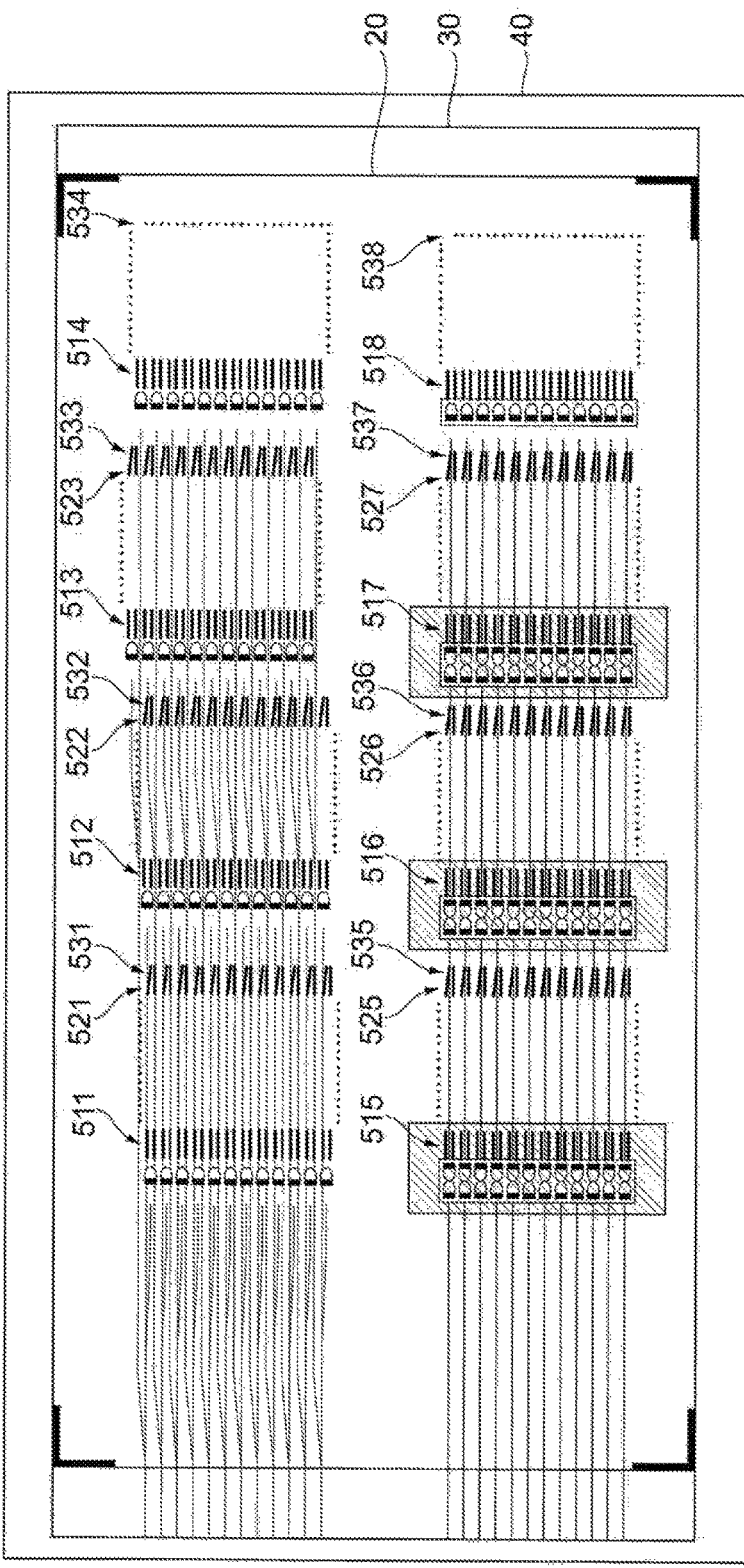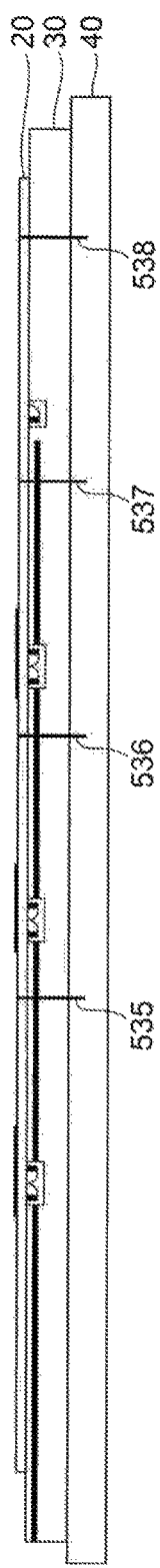
FIG.9A
FIG.9B

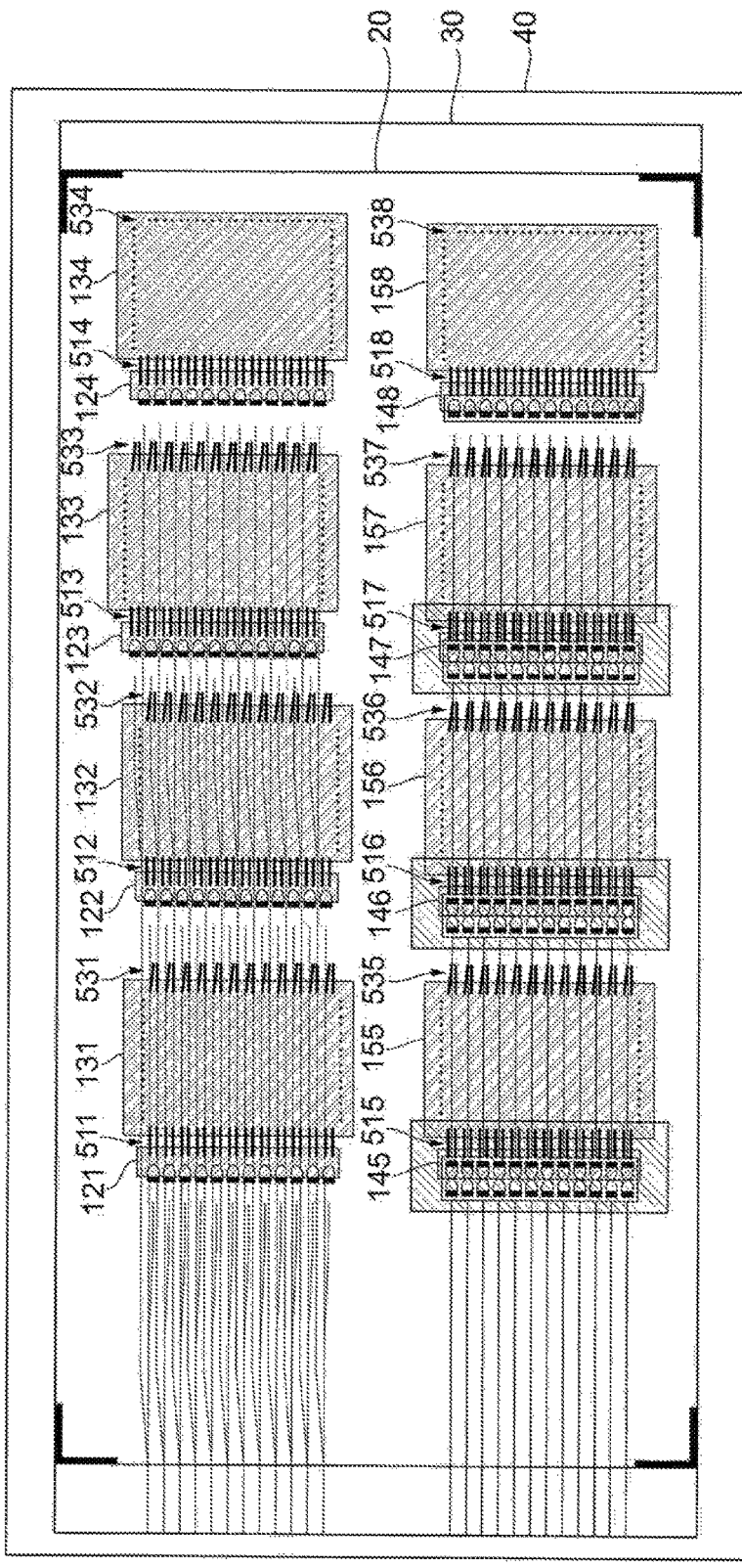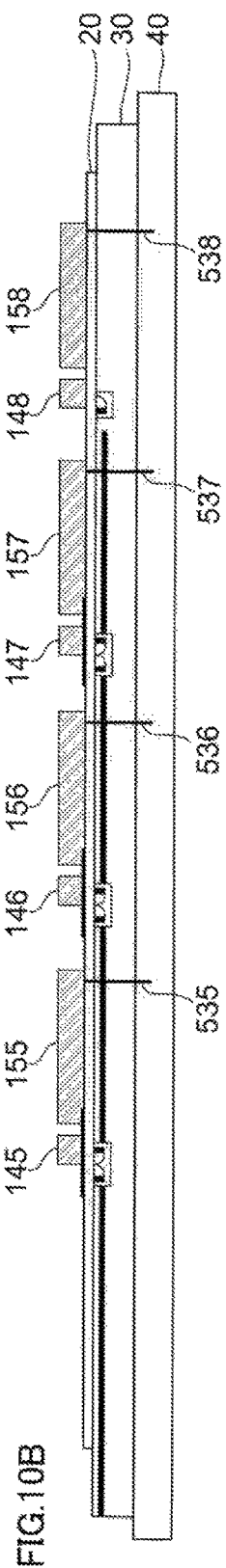
FIG.10A
FIG.10B

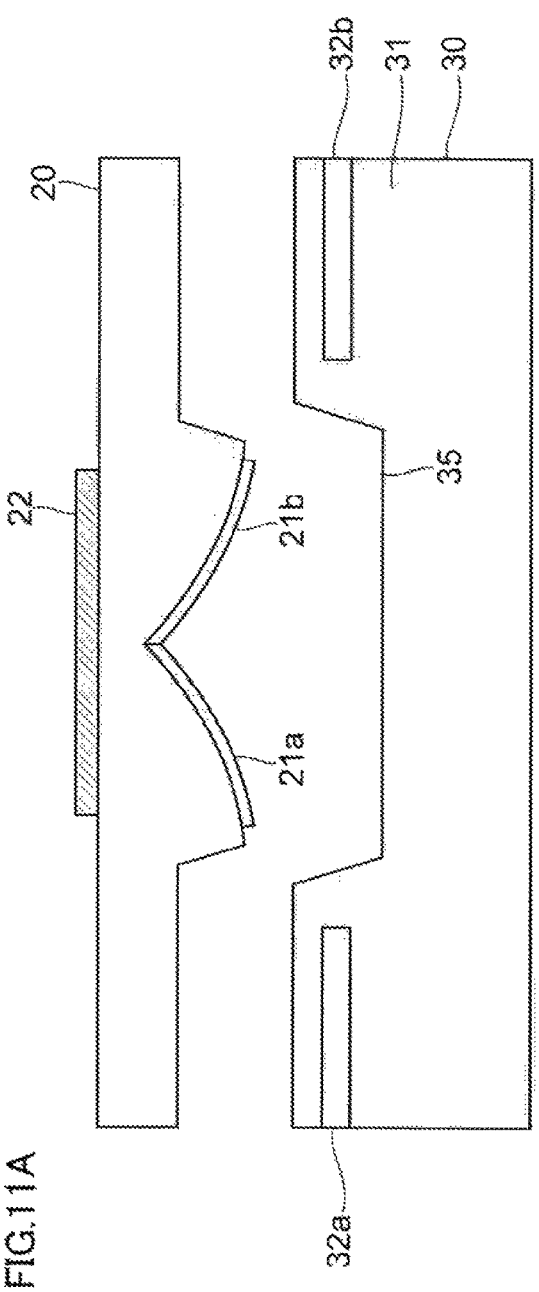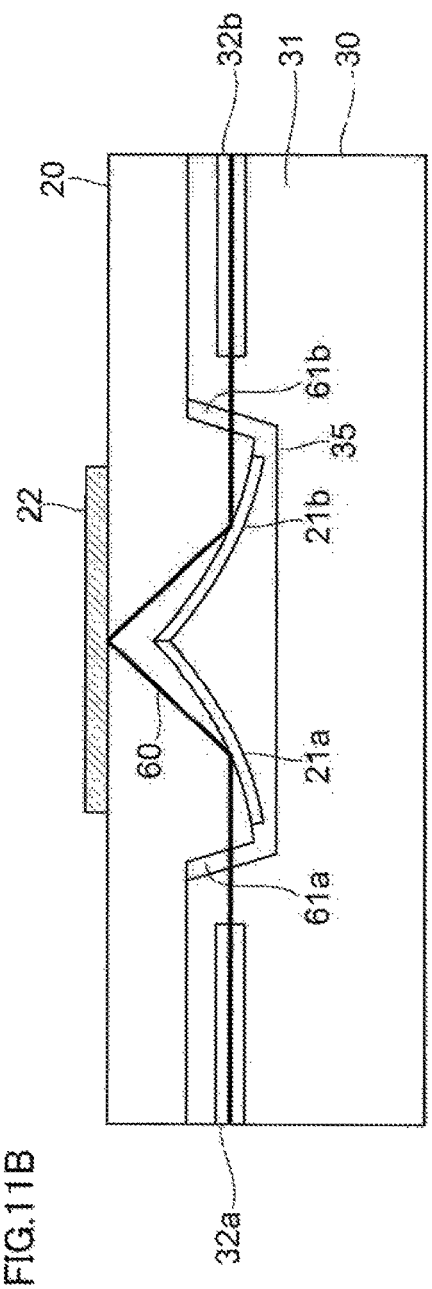

OPTICAL INTERCONNECT STRUCTURE

BACKGROUND

Technical Field

The present invention generally relates to an optical structure, and more particularly to an optical interconnect structure.

Description of the Related Art

Recently, various techniques have been known regarding an optical interconnect structure.

SUMMARY

According to an embodiment of the present invention, an optical interconnect structure is provided. The optical interconnect structure includes a plate on which a mirror is formed. The optical interconnect structure further includes a waveguide structure including a waveguide core and an opening. The plate is mounted on the waveguide structure such that the mirror is inserted in the opening for light coupling (i) from the waveguide core to an optical element positioned on the plate and (ii) to the waveguide core from the optical element positioned on the plate.

According to another embodiment of the present invention, a method for fabricating an optical interconnect structure is provided. The method includes forming a mirror on a plate. The method further includes fabricating a waveguide structure including a waveguide core and an opening. The method also includes mounting the plate on the waveguide structure such that the mirror is inserted in the opening for light coupling (i) from the waveguide core to an optical element positioned on the plate and (ii) to the waveguide core from the optical element positioned on the plate.

BRIEF DESCRIPTION OF THE DRAWINGS

FIGS. 3A and 3B depict a top view and a side view, respectively, of a plate at the first step of a plate fabrication step, in accordance with an exemplary embodiment of the present invention;

FIGS. 5A and 5B depict a top view and a side view, respectively, of a plate at the third step of a plate fabrication step, in accordance with an exemplary embodiment of the present invention;

FIGS. 8A and 8B depict a top view and a side view, respectively, of an assembly of a plate, a waveguide structure and a substrate at a plate fixing step, in accordance with an exemplary embodiment of the present invention;

FIGS. 9A and 9B depict a top view and a side view, respectively, of an assembly of a plate, a waveguide structure and a substrate at an electrical contact making step, in accordance with an exemplary embodiment of the present invention;

FIGS. 10A and 10B depict a top view and a side view, respectively, of an assembly of a plate, a waveguide structure and a substrate at a bonding step, in accordance with an exemplary embodiment of the present invention;

FIGS. 11A and 11B depict magnified cross sections representing a change in an optical layout of a single receiver, in accordance with an exemplary embodiment of the present invention;

DETAILED DESCRIPTION

Hereinafter, exemplary embodiments of the present invention will be described in detail with reference to the attached drawings.

It is to be noted that the present invention is not limited to these exemplary embodiments to be given below and can be implemented with various modifications within the scope of the present invention. In addition, the drawings used herein are for purposes of illustration, and may not show actual dimensions.

Recently, polymer waveguides and opto-electronic chips have been integrated to form multi-chip modules (MCMs) near central processing units (CPUs). In such MCMs, micro-mirrors have been used so that light beams from vertical cavity surface emitting laser (VCSEL) chip arrays go into the polymer waveguides and light beams from the polymer waveguides reach photodiode (PD) chip arrays. Thus, the alignment of the micro-mirrors is required to be precise. In view of this, the exemplary embodiments provide an MCM including a plate on which the micro-mirrors are fabricated.

Figure 1:
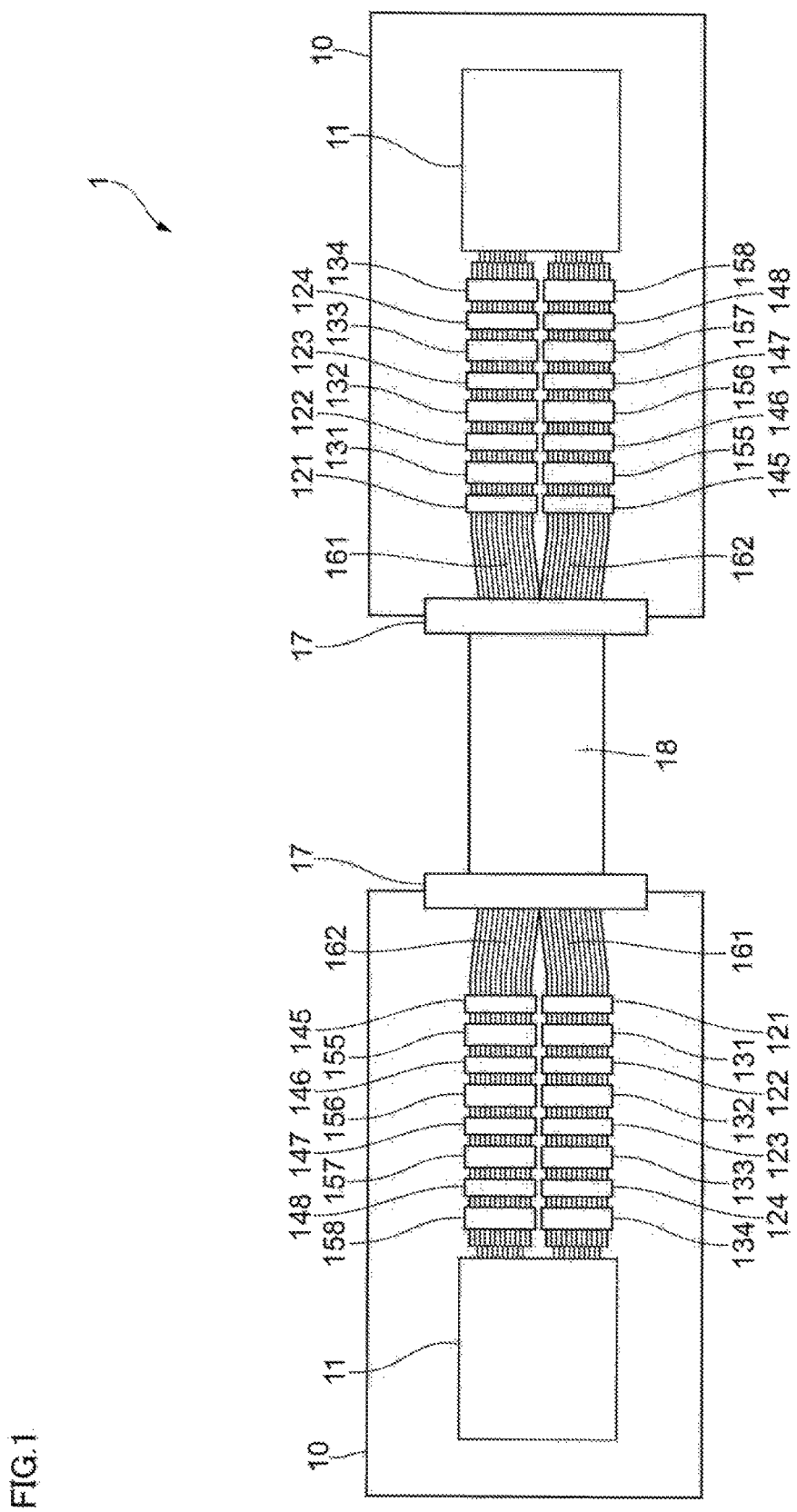
FIG. 1 depicts an example of a hardware configuration of an optical communication system, in accordance with an exemplary embodiment of the present invention.

Referring to FIG. 1, there is shown an example of a hardware configuration of an optical communication system 1, in accordance with an exemplary embodiment of the present invention. As shown in FIG. 1, the optical communication system 1 can include two multi-chip modules (MCMs) 10. A multi-chip module (MCM) 10 can include a central processing unit (CPU) 11, vertical cavity surface emitting laser (VCSEL) chip arrays 121 to 124 emitting light at different wavelengths, laser diode driver (LDD) chips 131 to 134, photodiode (PD) chip arrays 145 to 148, trans-impedance amplifier (TIA) chips 155 to 158, waveguide arrays 161 and 162, and a fiber connector 17. Further, as shown in FIG. 1, the optical communication system 1 can include a ribbon fiber cable 18 having, for example, 24 fiber cable cores.

The waveguide array 161 can include 12 waveguide cores corresponding to 12 fiber cable cores among the 24 fiber cable cores of the ribbon fiber cable 18. Each of the VCSEL chip arrays 121 to 124 can include 12 VCSEL devices corresponding to the 12 waveguide cores. The waveguide array 162 can include 12 waveguide cores corresponding to the other 12 fiber cable cores among the 24 fiber cable cores of the ribbon fiber cable 18. Each of the PD chip arrays 145 to 148 can include 12 PD devices corresponding to the 12 waveguide cores.

Additionally, a combination of a VCSEL chip array 121 and an LDD chip 131, a combination of a VCSEL chip array 122 and an LDD chip 132, a combination of a VCSEL chip array 123 and an LDD chip 133, and a combination of a VCSEL chip array 124 and an LDD chip 134 can serve to emit light of wavelengths λ1, λ2, λ3, and λ4, respectively. Further, a combination of a PD chip array 145 and a TIA chip 155, a combination of a PD chip array 146 and a TIA chip 156, a combination of a PD chip array 147 and a TIA chip 157, and a combination of a PD chip array 148 and a TIA chip 158 can serve to receive light of wavelengths λ1, λ2, λ3, and λ4, respectively.

The fabrication of the MCM 10 according to an exemplary embodiment is further described.

Figure 2:
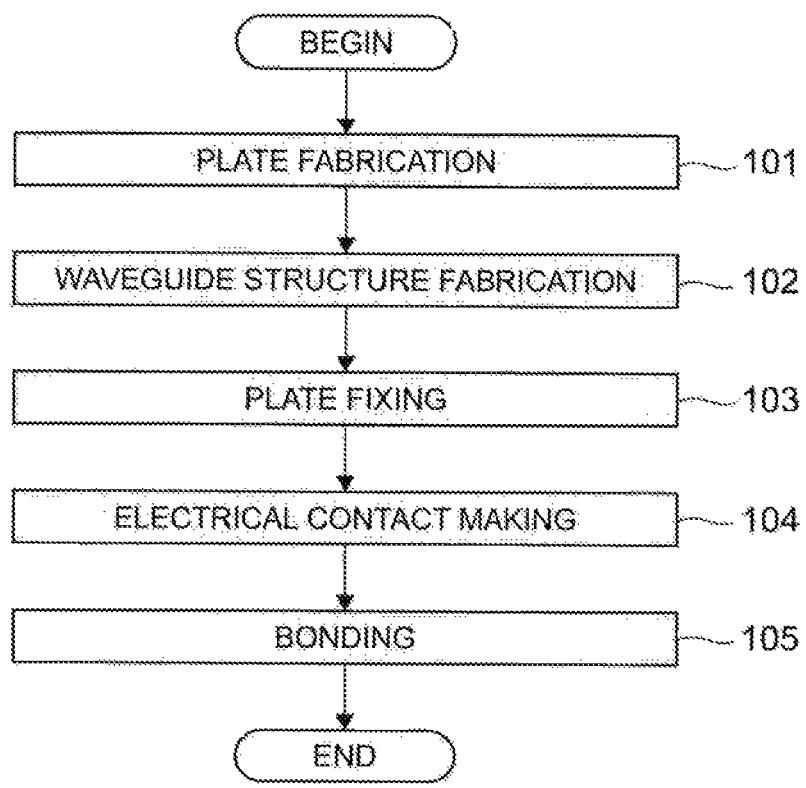
FIG. 2 depicts a flowchart representing an example of a fabrication procedure of an MCM, in accordance with an exemplary embodiment of the present invention.

Referring to FIG. 2, a flowchart is shown representing an example of a fabrication procedure of the MCM 10, in accordance with an exemplary embodiment of the present invention. As shown in FIG. 2, the fabrication procedure can include, in the time order, a plate fabrication step 101, a waveguide structure fabrication step 102, a plate fixing step 103, an electrical contact making step 104, and a bonding step 105.

Referring to FIGS. 3A and 3B, shown are a top view and a side view, respectively, of a plate 20 at the first step of the plate fabrication step 101, in accordance with an exemplary embodiment of the present invention. At this step, a plate 20 can be made from optical polymer for precision-molded optics. For example, Zeonex® can be used as the optical polymer. Off-axis micro-mirror arrays 211 to 214 can be formed using a cast (mold) on a transmitter side (an upper half) of the plate 20. Off-axis micro-mirror arrays 215 to 218 can be formed using a cast (mold) on a receiver side (a lower half) of the plate 20. Off-axis micro-mirrors included in each of the off-axis micro-mirror arrays 211 to 218 can have curved faces, for example, by being formed in an ellipsoid or paraboloid shape, and can be uncoated. The plate 20 with the off-axis micro-mirror arrays 211 to 218 can be fabricated by the same techniques as currently employed for custom-made micro-lens arrays, or by 3D printing techniques with a resolution much better than one micrometer. For example, a vertical length and a horizontal length of the plate 20 indicated in FIG. 3A can be 10 millimeters and 20 millimeters, respectively. Thickness of the plate 20 indicated in FIG. 3B can be 200 micrometers. Note that, in FIG. 3A, the off-axis micro-mirror arrays 211 to 218 are indicated on the plate 20, although fixed beneath the plate 20 in reality. Further, since the side view in FIG. 3B is depicted as a view seen from the receiver side, only components on the receiver side are illustrated in the side view.

Figure 4A:
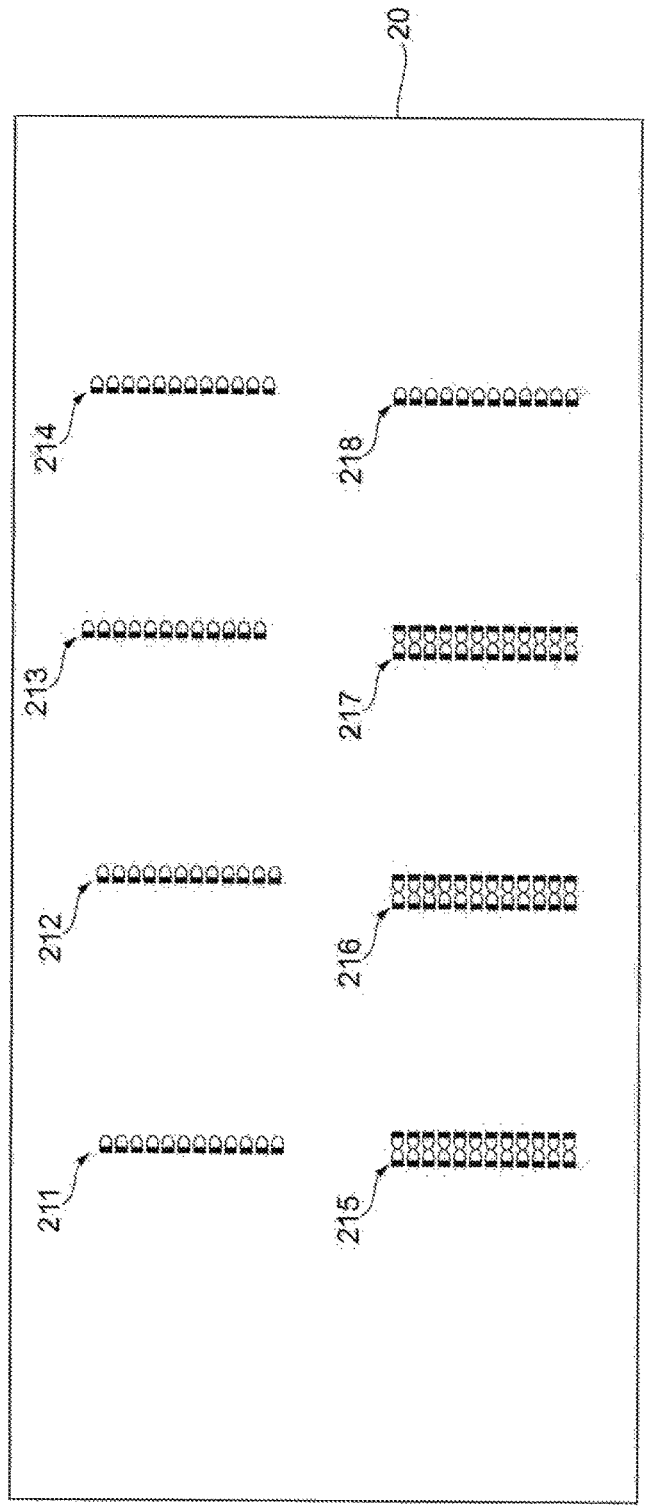
FIGS. 4A and 4B depict a top view and a side view, respectively, of a plate at the second step of a plate fabrication step, in accordance with an exemplary embodiment of the present invention.
Figure 4B:
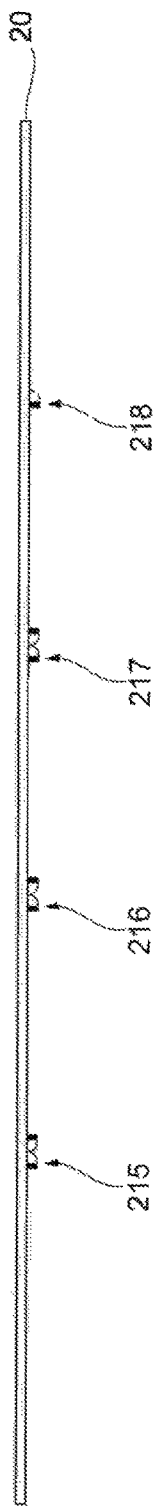

Referring to FIGS. 4A and 4B, there are shown a top view and a side view, respectively, of the plate 20 at the second step of the plate fabrication step 101, in accordance with an exemplary embodiment of the present invention. At this step, reflective layers (indicated by white portions) can be formed on the off-axis micro-mirror arrays 211 to 218. For example, gold can be deposited to form the reflective layers.

Referring to FIGS. 5A and 5B, there are shown a top view and a side view, respectively, of the plate 20 at the third step of the plate fabrication step 101, in accordance with an exemplary embodiment of the present invention. At this step, filters 225 to 227 can be deposited on top of the plate 20. The filters 225 to 227 can have wavelength selectivity, and can be deposited on the receiver side above the off-axis micro-mirror arrays 215 to 217, respectively. For example, Bragg filters can be used as the filters 225 to 227.

Figure 6A:
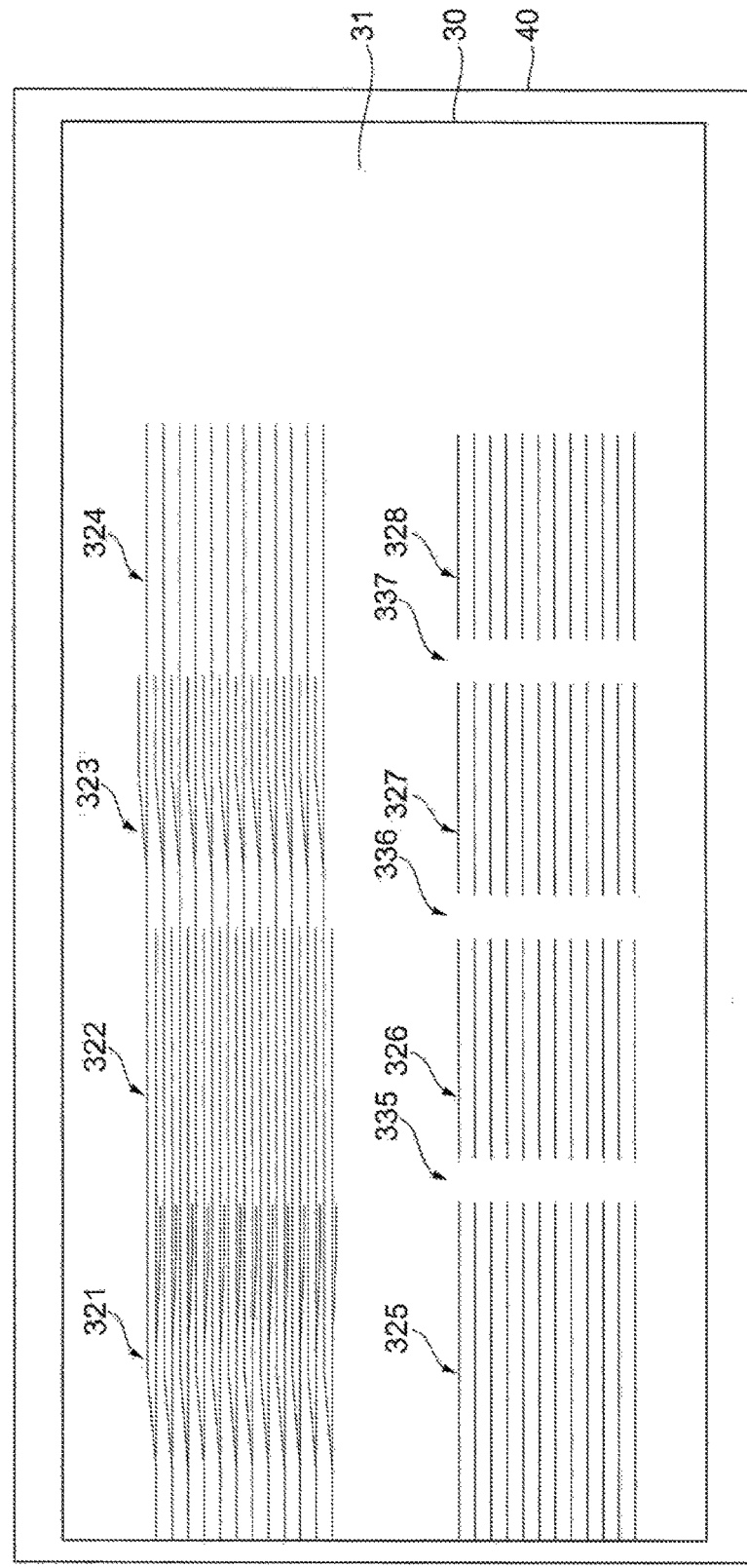
FIGS. 6A and 6B depict a top view and a side view, respectively, of an assembly of a waveguide structure and a substrate at the first step of a waveguide structure fabrication step, in accordance with an exemplary embodiment of the present invention.
Figure 6B:
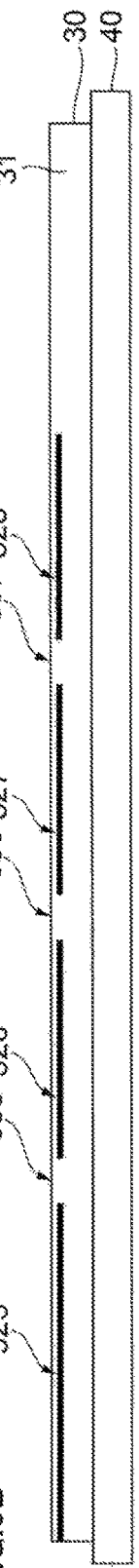

Referring to FIGS. 6A and 6B, there are shown a top view and a side view, respectively, of an assembly of a waveguide structure 30 and a substrate 40 at the first step of the waveguide structure fabrication step 102, in accordance with an exemplary embodiment of the present invention. Prior to this step, the top of a clad 31 can be made flat by spinning or other suitable method. At this step, the waveguide structure 30 can be mounted on the substrate 40, which is an organic carrier. Then, waveguide core arrays 321 to 328 can be formed in the waveguide structure 30. Thus, beam expansion areas 335, 336, and 337 for the receiver side are formed between the waveguide core arrays 325 and 326, between the waveguide core arrays 326 and 327, and between the waveguide core arrays 327 and 328, respectively. For example, a vertical length and a horizontal length of the waveguide structure 30 indicated in FIG. 6A can be 10 millimeters and 22 millimeters, respectively.

Figures 7A, 7B:
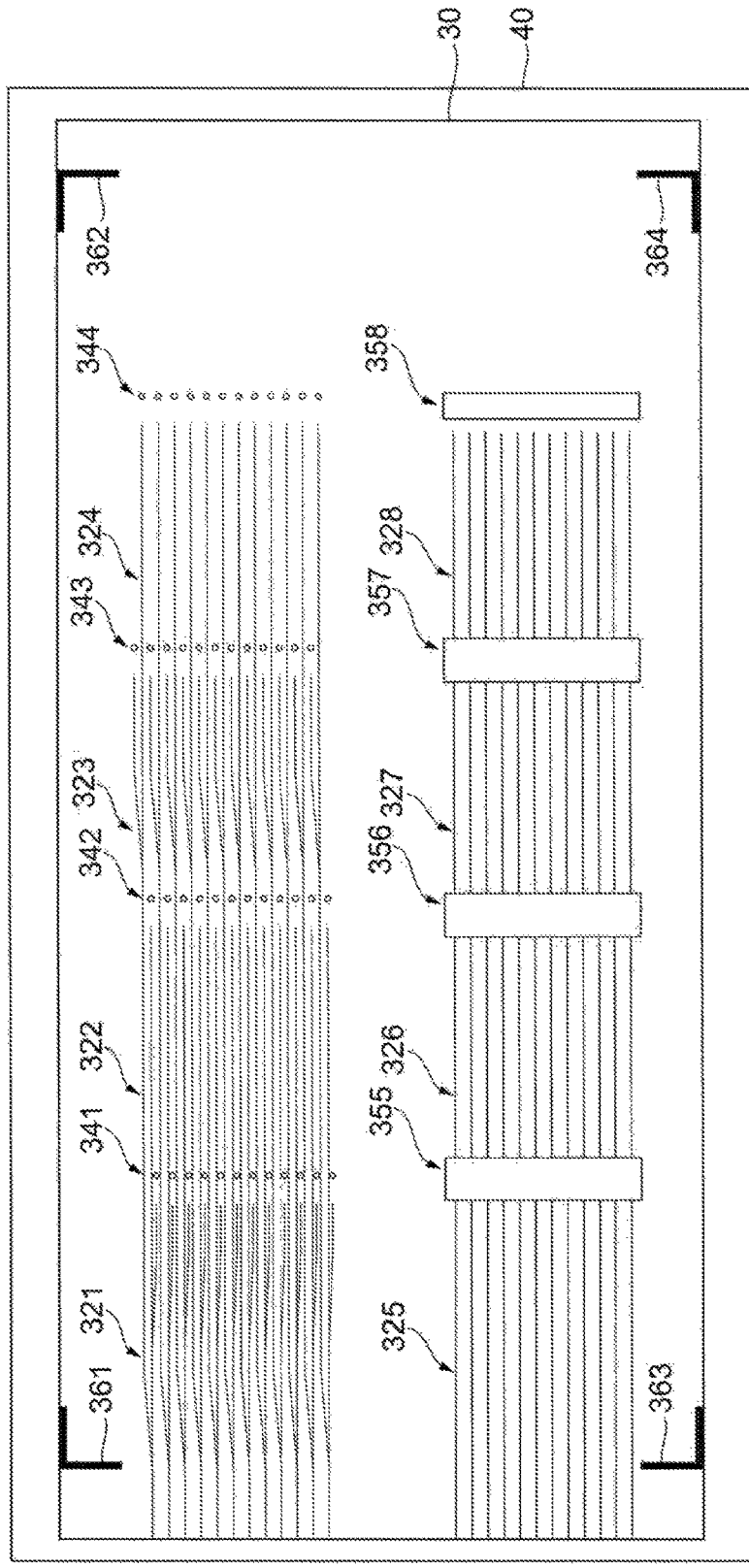
FIGS. 7A and 7B depict a top view and a side view, respectively, of an assembly of a waveguide structure and a substrate at the second step of a waveguide structure fabrication step, in accordance with an exemplary embodiment of the present invention.

Referring to FIGS. 7A and 7B, there are shown a top view and a side view, respectively, of an assembly of the waveguide structure 30 and the substrate 40 at the second step of the waveguide structure fabrication step 102, in accordance with an exemplary embodiment of the present invention. At this step, cavity arrays 341 to 344, each serving as one example of an opening portion, can be formed for insertion of the off-axis micro-mirror arrays 211 to 214 on the transmitter side. In FIG. 7A, although the sizes of cavities included in the cavity arrays 341 to 344 should be large enough to receive insertion of the off-axis micro-mirror arrays 211 to 214, the cavities are illustrated in smaller sizes for convenience of illustration. Alternatively, grooves can be formed instead of the cavity arrays 341 to 344. Further, grooves 355 to 358, each serving as one example of an opening portion, can be formed for insertion of the off-axis micro-mirror arrays 215 to 218 on the receiver side. Then, an underfill can be inserted in the grooves 355 to 358. Alternatively, cavity arrays can be formed instead of the grooves 355 to 358. In addition, alignment marks 361 to 364 can be made for precise alignment of the plate 20. For example, the alignment marks 361 to 364 can be optically readable marks such as marks carved on the waveguide structure 30.

Referring to FIGS. 8A and 8B, there are shown a top view and a side view, respectively, of an assembly of the plate 20, the waveguide structure 30 and the substrate 40 at the plate fixing step 103, in accordance with an exemplary embodiment of the present invention. At this step, the plate 20 can be fixed on the waveguide structure 30 which has been mounted on the substrate 40.

Referring to FIGS. 9A and 9B, there are shown a top view and a side view, respectively, of an assembly of the plate 20, the waveguide structure 30 and the substrate 40 at the electrical contact making step 104, in accordance with an exemplary embodiment of the present invention. At this step, electrical pad arrays 511 to 518, electrical pad arrays 521 to 523 and 525 to 527, and electrical via arrays 531 to 538 can be made. However, the electrical pad arrays 515 to 518 and the electrical pad arrays 525 to 527, which are present on the receiver side, are not shown in FIG. 9B because they are extremely thin.

Referring to FIGS. 10A and 10B, there are shown a top view and a side view, respectively, of an assembly of the plate 20, the waveguide structure 30 and the substrate 40 at the bonding step 105 according to an exemplary embodiment. At this step, the VCSEL chip arrays 121 to 124, the LDD chips 131 to 134, the PD chip arrays 145 to 148, and the TIA chips 155 to 158 can be flip-chip bonded on the plate 20. The VCSEL chip arrays 121 to 124 can be connected to the electrical pad arrays 511 to 514, respectively. The LDD chips 131 to 134 can be connected to the electrical pad arrays 511 to 514 and the electrical via arrays 531 to 534, respectively. The PD chip arrays 145 to 148 can be connected to the electrical pad arrays 515 to 518, respectively. The TIA chips 155 to 158 can be connected to the electrical pad arrays 515 to 518 and the electrical via arrays 535 to 538, respectively.

Next, an explanation is given in detail about the fixing of the plate 20 on the waveguide structure 30 at the plate fixing step 103.

Referring to FIGS. 11A and 11B, there are shown magnified cross sections representing a change in an optical layout of a single receiver, in accordance with an exemplary embodiment of the present invention. First, as shown in FIG. 11A, the plate 20 and the waveguide structure 30 may be prepared. The plate 20 can be provided with off-axis micro-mirrors 21a and 21b and a filter 22. The waveguide structure 30 can be provided with the clad 31, waveguide cores 32a and 32b, and a groove 35. For example, a width of the groove 35 can be 1100 micrometers. Then, as shown in FIG. 11B, the plate 20 can be fixed on the waveguide structure 30. After fixing the plate 20, an underfill can be inserted in the groove 35. Further, clearance margins 61a and 61b can be formed between the plate 20 and the waveguide structure 30. This configuration can enable the off-axis micro-mirrors 21a to change the direction of a light beam 60 outputted from the waveguide core 32a so that the light beam 60 focuses onto the filter 22, and the off-axis micro-mirrors 21b to change the direction of the light beam 60 reflected by the filter 22 so that the light beam 60 goes into the waveguide core 32b.

By the above fabrication procedure, the MCM 10 can have tolerance for misalignment of the plate 20. An explanation is given in detail about such tolerance below.

Figure 12A:
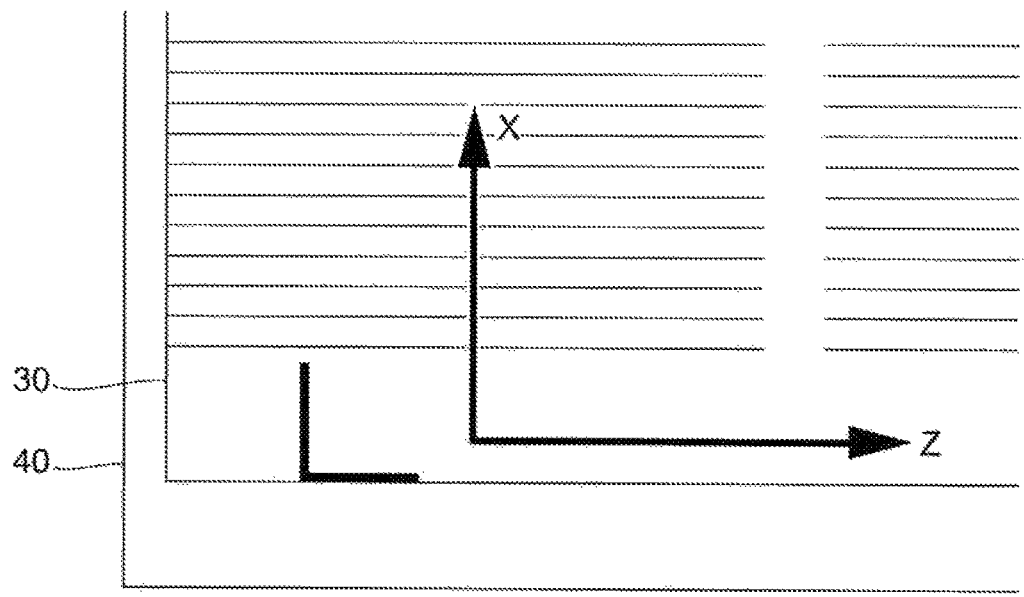
FIGS. 12A and 12B depict arrows indicating X, Y and Z directions on an assembly of a waveguide structure and a substrate, in accordance with an exemplary embodiment of the present invention.
Figure 12B:
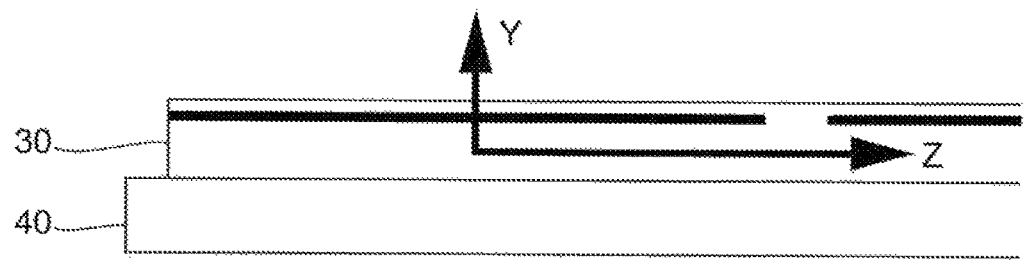

Referring to FIG. 12A, there are shown arrows indicating X and Z directions on the assembly of the waveguide structure 30 and the substrate 40, in accordance with an exemplary embodiment of the present invention. Referring to FIG. 12B, there are shown arrows indicating Y and Z directions on the assembly of the waveguide structure 30 and the substrate 40.

First, the tolerance for misalignment of the plate 20 to the Z direction will be explained. The clearance margin 61a (61b) may avoid contact between the waveguide core 32a (32b) and the off-axis micro-mirror 21a (21b). Thus, the distance between the end of the waveguide core 32a (32b) and the off-axis micro-mirror 21a (21b) is not critical. The focus position does not change with the misalignment of the off-axis micro-mirror 21a (21b). The spot size on the filter 22 is nearly insensitive to the position shift of the off-axis micro-mirror 21a (21b).

Second, the tolerance for misalignment of the plate 20 to the X direction will be explained. The alignment marks 361 to 364 are positioned very precisely with the waveguide core arrays 321 to 328. As the plate 20 is large, misplacement errors are small. Meanwhile, the light beam 60 is expanded along the Z direction so that the spot size on the filter 22 becomes much larger than the size of the waveguide core 32a. Thus, the relative misalignment remains small even if there is a position shift to the X direction between the waveguide core 32a (32b) and the off-axis micro-mirror 21a (21b).

Third, the tolerance for misalignment of the plate 20 to the Y direction will be explained. The plate 20 itself is highly precise. As the plate 20 sits firmly on the clad 31 over a large area, the assembly of the plate 20 and the waveguide structure 30 is mechanically stable. Thus, the position shift to the Y direction is minimized.

Fourth, the tolerance for angular misalignment of the plate 20 will be explained. As the plate 20 sits firmly on the clad 31 over a large area, the angular misalignment is minimized.

In addition, the tolerance for strain and thermal expansion of the plate 20 will be explained. Under thermal stress, the assembly of the waveguide structure 30 and the substrate 40 could slightly bend or expand. With respect to this problem, a soft vacuum chuck can be applied to the plate 20 as the first solution. Transparent polymers or glass-like materials are suitable as the soft vacuum chuck. Therefore, the plate 20 may have some flexibility. The plate 20 can follow any bending of the waveguide structure 30 as it firmly sits on the clad 31. Alternatively, a hard vacuum chuck can be applied to the plate 20 as the second solution. The hard vacuum chuck can be suitable for unbendable materials such as semiconductor wafers, and can be used with adhesive filling a void between the plate 20 and the waveguide structure 30.

Next, an explanation is given in detail about a structure of the transmitter side of the MCM 10.

Figure 13:
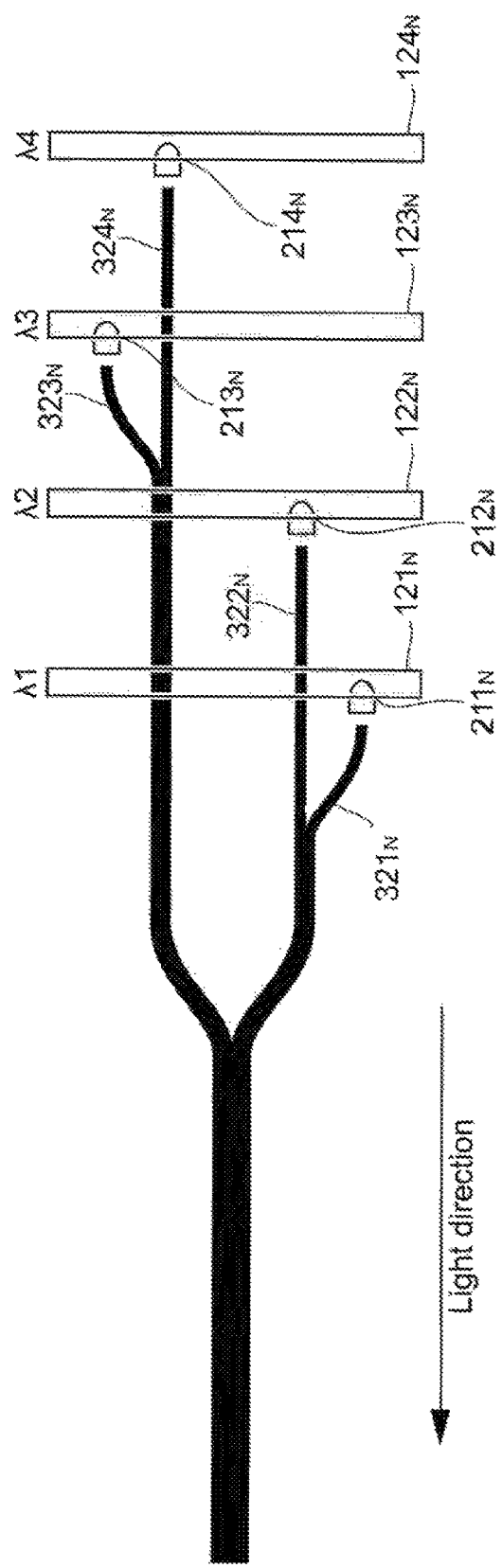
FIG. 13 depicts a schematic view of a portion corresponding to core number N on a transmitter side, in accordance with an exemplary embodiment of the present invention.

Referring to FIG. 13, there is shown a schematic view of a portion corresponding to core number N on the transmitter side, in accordance with an exemplary embodiment of the present invention. Note that the schematic view is depicted so that a light direction matches the left direction, as indicated by an arrow. As shown in the figure, the portion can include VCSEL devices $121_N$ to $124_N$ for wavelengths λ1 to λ4, respectively. The portion can include off-axis micro-mirrors $211_N$ to $214_N$ for wavelengths λ1 to λ4, respectively. The off-axis micro-mirrors $211_N$ to $214_N$ can be used for low loss of light. Further, the portion can include waveguide cores $321_N$ to $324_N$ for wavelengths λ1 to λ4, respectively. Each of the waveguide cores $321_N$ to $324_N$ can be curved to combine lights of wavelengths λ1 to λ4. The final waveguide core formed by joining the waveguide cores $321_N$ to $324_N$, which is depicted on the most left side of the figure, can be wider than any one of the waveguide cores $321_N$ to $324_N$ for low loss of light. The final waveguide core can be wider than or have the same width as a waveguide core on the receiver side. For example, the width of the final waveguide core can be 40 micrometers.

Next, an explanation is given in detail about a layout of the electrical contacts.

Figure 14A:
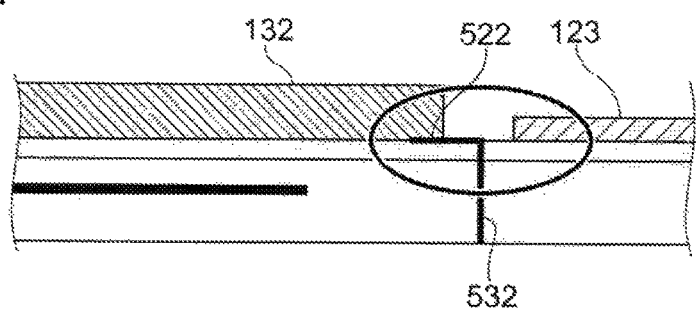
FIGS. 14A and 14B depict a side view and a top view, respectively, of a transmitter side of an MCM, in accordance with an exemplary embodiment of the present invention.
Figure 14B:
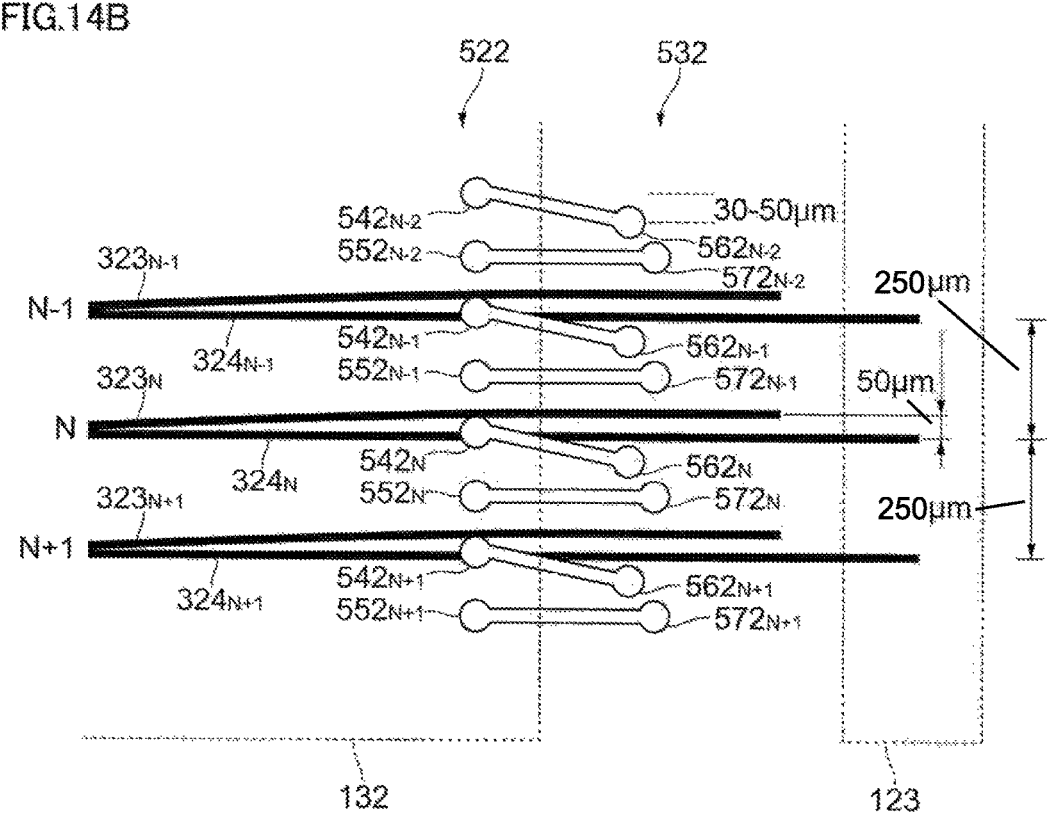

Referring to FIGS. 14A and 14B, there are shown a side view and a top view, respectively, of the transmitter side of the MCM 10, in accordance with an exemplary embodiment of the present invention. FIG. 14B is a magnified figure of the part encircled by an ellipse in FIG. 14A. As shown in FIG. 14B, the electrical pad array 522, which is connected to the LDD chip 132, can include electrical pads $542_N$ and $552_N$ for core number N. The electrical via array 532, which is located between the LDD chip 132 and the VCSEL chip array 123 when viewed from above, can include electrical vias $562_N$ and $572_N$ for core number N. The electrical via array 532 can be connected to metal lines located underneath the waveguide structure 30 to link with another chip such as a CPU. The electrical pad $542_N$ and the electrical via $562_N$ are connected by metal lines, and the electrical pad $552_N$ and the electrical via $572_N$ are connected by metal lines. The positions of the electrical pads $542_N$ and $552_N$ can be determined by the specifications of the LDD chip 132. Therefore, the electrical pad $542_N$ can be located above a waveguide core $324_N$. The position of the corresponding electrical via $562_N$ can then be shifted to be located between the cores $323_{N+1}$ and $324_N$ so that the electrical via $562_N$ does not interfere with light propagation. The typical diameter of the electrical via is 30 to 70 micrometers.

Note that, although each of the VCSEL chip arrays 121 to 124 is assumed as an opposite side of light coupling with a corresponding one of the waveguide core arrays 321 to 324, and each of the PD chip arrays 145 to 148 is assumed as an opposite side of light coupling with a corresponding one of the waveguide core arrays 325 to 328 in the foregoing description, the opposite side of the light coupling is not limited to this. More generally, an optical element array can serve as the opposite side of the light coupling. The optical element array can typically include a fiber connector array and a mirror array, besides an optical chip array such as a VCSEL chip array or a PD chip array.

Also, although each of the off-axis micro-mirror arrays 211 to 218 is assumed to include off-axis micro-mirrors each having a curved face in the foregoing description, the type of the micro-mirrors is not limited to this. For example, each of the micro-mirrors can have a flat face.

Further, although each of the off-axis micro-mirror arrays 211 to 218 is assumed to include several off-axis micro-mirrors in the foregoing description, the number of the off-axis micro-mirrors is not limited to this case. For example, each of the off-axis micro-mirror arrays 211 to 218 can include an arbitrary number of off-axis micro-mirrors. The arbitrary number can be one.

Figure 15:
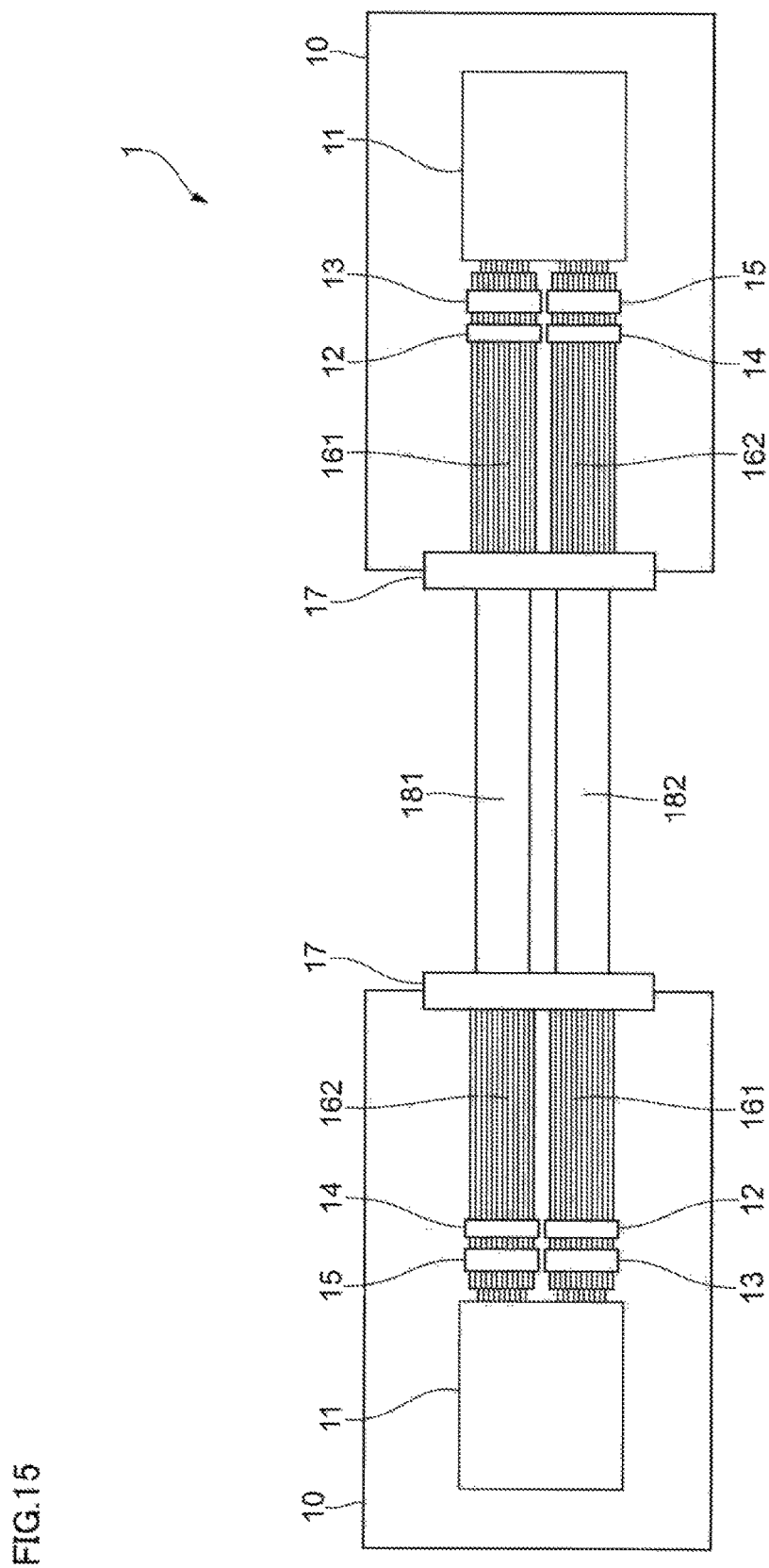
FIG. 15 depicts an example of a hardware configuration of an optical communication system, in accordance with another exemplary embodiment of the present invention.

Referring to FIG. 15, there is shown an example of a hardware configuration of an optical communication system 1 according to another exemplary embodiment with a single wavelength design, i.e., without wavelength division multiplexing. As shown in the figure, the optical communication system 1 can include two multi-chip modules (MCMs) 10. A multi-chip module (MCM) 10 can include a central processing unit (CPU) 11, a vertical cavity surface emitting laser (VCSEL) chip array 12, a laser diode driver (LDD) chip 13, a photodiode (PD) chip array 14, a trans-impedance amplifiers (TIA) chip 15, waveguide arrays 161 and 162, and a fiber connector 17. Further, as shown in the figure, the optical communication system 1 can include fiber cables 181 and 182 each having several (e.g., 12 or 24) fiber cable cores.

The waveguide array 161 can include a multitude of waveguide cores whose number matches the number of cores of the fiber cable 181 or 182. The VCSEL chip array 12 can include a multitude of VCSEL devices whose number matches the number of cores of the waveguide array 161. The waveguide array 162 can include a multitude of waveguide cores whose number matches the number of cores of the fiber cable 181 or 182. The PD chip array 14 can include a multitude of PD devices whose number matches the number of cores of the waveguide array 162.

The fabrication of the MCM 10 explained referring to FIGS. 2 to 14B can be applicable to the optical communication system 1 of FIG. 15.

It is to be understood that aspects of the present invention will be described in terms of a given illustrative architecture; however, other architectures, structures, substrate materials and process features and steps can be varied within the scope of aspects of the present invention.

It will also be understood that when an element such as a layer, region or substrate is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

The present embodiments can include a design for an integrated circuit chip, which can be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer can transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein can be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should also be understood that material compounds will be described in terms of listed elements, e.g., SiGe. These compounds include different proportions of the elements within the compound, e.g., SiGe includes $Si_xGe_{1-x}$ where x is less than or equal to 1, etc. In addition, other elements can be included in the compound and still function in accordance with the present principles. The compounds with additional elements will be referred to herein as alloys.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, can be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein can be interpreted accordingly. In addition, it will also be understood that when a layer is referred to as being "between" two layers, it can be the only layer between the two layers, or one or more intervening layers can also be present.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present concept.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. An optical interconnect structure, comprising:
   a plate on which a mirror is formed; and
   a waveguide structure comprising a waveguide core and an opening,
   wherein the plate is mounted on the waveguide structure such that the mirror is inserted in the opening for light coupling (i) from the waveguide core to an optical element positioned on a side of the plate opposite to the mirror and (ii) to the waveguide core from the optical element positioned on the side of the plate opposite to the mirror, the optical element in communication with at least one electronic device positioned on the side of the plate.

2. The optical interconnect structure of claim 1, wherein the mirror further comprises an off-axis mirror having a curved face.

3. The optical interconnect structure of claim 1, wherein a substantially flat horizontal portion of the plate is mounted on a top clad of the waveguide structure.

4. The optical interconnect structure of claim 1, wherein alignment marks matching corners of the plate are present on a top clad of the waveguide structure.

5. The optical interconnect structure of claim 1, wherein the optical element is flip-chip bonded on the plate above the mirror.

6. The optical interconnect structure of claim 1, wherein the mirror comprises a mirror array formed on the plate, the mirror array including a plurality of mirrors,
   wherein the waveguide core and the opening included in the waveguide structure respectively comprise a waveguide core array and at least one opening portion, the waveguide core array including a plurality of waveguide cores, and
   wherein the plate is mounted on the waveguide structure such that the mirror array is inserted in the at least one opening portion for light coupling (i) from the waveguide core array to the optical element array positioned on the plate and (ii) to the waveguide core array from the optical element array positioned in the plate.

7. The optical interconnect structure of claim 1, wherein the mirror comprises a plurality of mirror arrays formed on the plate, each of the plurality of mirror arrays including a plurality of mirrors,
   wherein the waveguide core and the opening included in the waveguide structure respectively comprise a plurality of waveguide core arrays and a plurality of opening portions, each of the plurality of waveguide core arrays including a plurality of waveguide cores,
   wherein the optical element positioned on the plate comprises a plurality of optical element arrays, and
   wherein the plate is mounted on the waveguide structure such that each of the plurality of mirror arrays is inserted in a respective one of the plurality of opening portions for light coupling, the light coupling being (i) from respective ones of the plurality of waveguide core arrays to respective ones of the plurality of optical element arrays positioned on the plate and (ii) to respective other ones of the plurality of waveguide core arrays from respective other ones of the plurality of optical element arrays positioned on the plate.

8. The optical interconnect structure of claim 7, further comprising a plurality of filters mounted on the plate, wherein each of the plurality of filters is deposited under a respective one of the plurality of optical element arrays and above a respective one of the plurality of mirror arrays on a receiver side of the plate, each of the plurality of filters reflecting or transmitting light selectively dependent upon a wavelength of the light.

9. The optical interconnect structure of claim 8, wherein the plurality of mirrors included in each of at least one of the plurality of mirror arrays on the receiver side of the plate includes pairs of mirror pieces positioned in back-to-back configurations such that (i) light outputted from a corresponding first one of the plurality of waveguide core arrays focuses onto a corresponding one of the plurality of filters and (ii) light reflected by the corresponding one of the plurality of filters re-enters a corresponding second one of the plurality of waveguide core arrays.

10. The optical interconnect structure of claim 1, wherein the optical element includes a laser chip array and a photodiode chip array; and wherein the plate includes a plurality of optical elements formed thereon, each optical element being configured to couple a different wavelength of light.

11. The optical interconnect structure of claim 1, wherein the plate further includes a central processing unit, a laser diode driver chip and an amplifier chip formed thereon.

12. A method for fabricating an optical interconnect structure, the method comprising:
    forming a mirror on a plate;
    fabricating a waveguide structure including a waveguide core and an opening;
    mounting the plate on the waveguide structure; and
    inserting the mirror in the opening for light coupling (i) from the waveguide core to an optical element positioned on a side of the plate opposite to the mirror and (ii) to the waveguide core from the optical element positioned on the side of the plate opposite to the mirror, the optical element in communication with at least one electronic device formed on the side of the plate.

13. The method of claim 12, wherein said forming step comprises forming a plurality of mirror arrays on the plate, each of the plurality of mirror arrays including a plurality of mirrors,
    wherein said fabricating step comprises fabricating a plurality of waveguide core arrays and a plurality of opening portions, each of the plurality of waveguide core arrays including a plurality of waveguide cores, wherein the optical element positioned on the plate comprises a plurality of optical element arrays, and
    wherein said inserting step comprises inserting each of the plurality of mirror arrays in a respective one of the plurality of opening portions for light coupling, the light coupling being (i) from respective ones of the plurality of waveguide core arrays to respective ones of the plurality of optical element arrays positioned on the plate and (ii) to respective other ones of the plurality of waveguide core arrays from respective other ones of the plurality of optical element arrays positioned on the plate.

* * * * *